Oct. 2, 1923.
W. P. SHORTELL
1,469,340
POULTRY FEEDER
Filed March 29, 1922
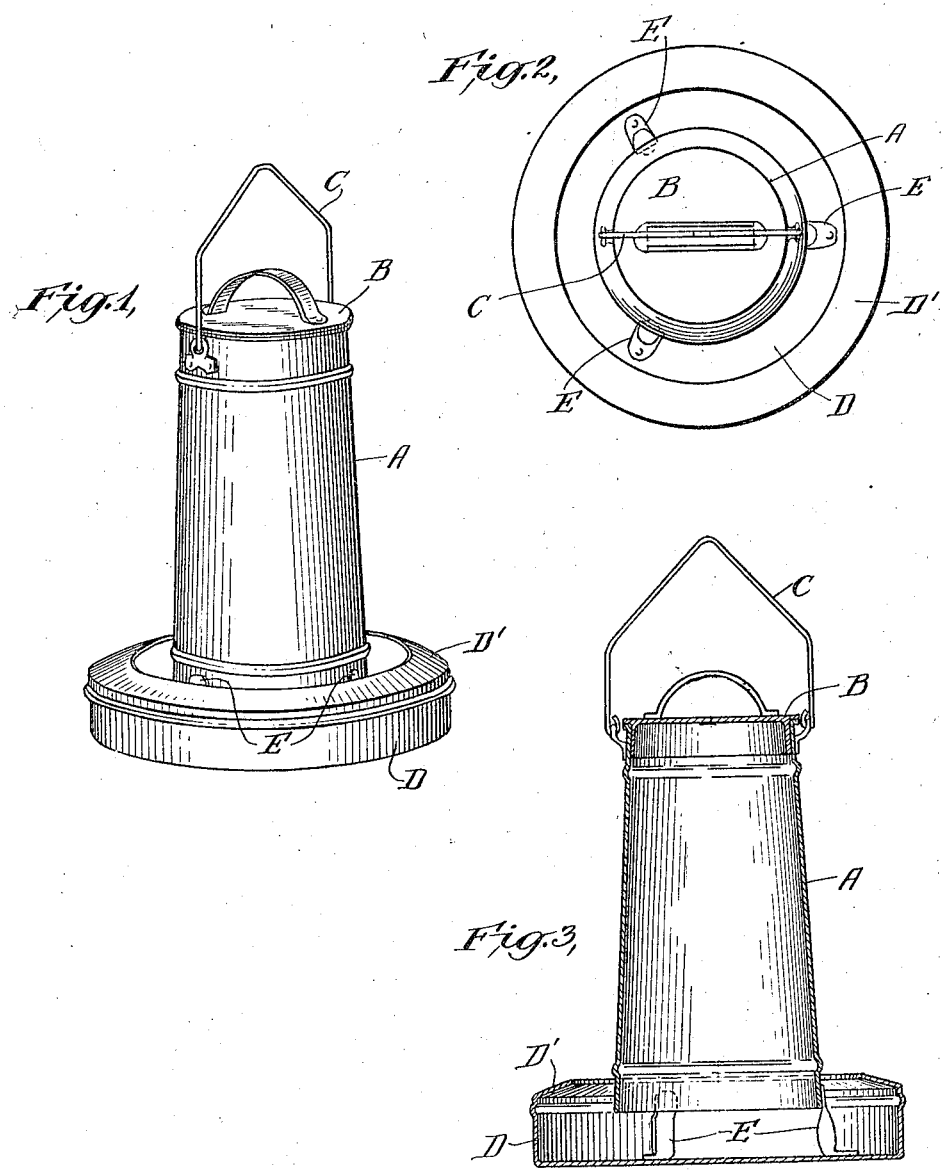
INVENTOR
William P. Shortell
BY John E. Hubbell
ATTORNEY Patented Oct. 2, 1923.

1,469,340

UNITED STATES PATENT OFFICE.

WILLIAM P. SHORTELL, OF POUGHKEEPSIE, NEW YORK.

POULTRY FEEDER.

Application filed March 29, 1922. Serial No. 547,603.

*To all whom it may concern:*

Be it known that I, WILLIAM P. SHORTELL, a citizen of the United States, and a resident of Poughkeepsie, in the county of Dutchess and State of New York, have invented certain new and useful Improvements in Poultry Feeders, of which the following is a specification.

The general object of my present invention is to provide a poultry feeder of simple, durable and relatively inexpensive construction, characterized by the provisions made for continuously maintaining a supply of food available to the poultry to be fed and by the provisions made for preventing wastage of food.

The various features of novelty which characterize my invention are pointed out with particularity in the claim annexed to and forming a part of this specification. For a better understanding of the invention, however, and its advantages, reference should be had to the accompanying drawings and descriptive matter in which I have illustrated and described a preferred embodiment of my invention.

Of the drawings:

Fig. 1 is a perspective view;

Fig. 2 is a plan view; and

Fig. 3 is a vertical section.

The improved chicken feeder comprises a magazine A of frusto-conical form which is vertically disposed, and is provided with a removable cover B for its smaller upper end and preferably is provided also with a bail or handle C. The lower end of the magazine A extends into a receptacle D to which it is secured by legs E so as to space the lower edge of the magazine above the bottom of the receptacle D. The latter is in the form of a shallow pan having its upper edge inturned to provide a flange D'. The flange D' is at a level somewhat above the bottom edge of the magazine A, and is separated from the latter by a comparatively narrow annular slot or space through which the food may be reached by the poultry. Advantageously the parts are formed of sheet metal such as galvanized iron and the legs E may be riveted or brazed to the magazine and to the bottom of the pan D. The flange D' of the receptacle D may be spun and preferably is inclined downwardly from its inner margin, and covers more than half the horizontal area of the annular space between the bottom edge of the magazine and the cylindrical body of the pan D.

My improved poultry feeder is obviously simple and durable in construction and relatively inexpensive to construct. The conical form of the magazine minimizes trouble sometimes experienced in poultry feeders of this general character due to the food arching in the magazine and not feeding regularly down into the receptacle as the latter is emptied. The proper feed of the food from the magazine A into the receptacle D is facilitated, moreover, by the fact that the legs E are comparatively slender in form, and offer little obstruction to the down flow of the food. The provision of the inturned flange D' at the top of the receptacle D permits of the parts being proportioned to hold a desirably large accumulation of food in the receptacle D while at the same time it reduces the amount of food thrown out of the receptacle by the poultry feeding therefrom, and it minimizes the fouling of the food by the poultry as they feed from the receptacle. The flange D' also forms a partial cover for the mass of the food in the receptacle materially restricting the amount of rain and snow passing into the receptacle when the poultry feeder is exposed to the elements.

Having now described my invention, what I claim as new and desire to secure by Letters Patent, is:

A poultry feeder comprising a food magazine of frusto-conical form and open at both ends which is vertically disposed with its larger end at the bottom, a removable cover for the top of said magazine, a pan-like receptacle into which the lower end of the magazine extends, said receptacle comprising a cylindrical body of substantially larger diameter than that of the lower end of the magazine, and a sharply inturned flange at the upper end of said cylindrical body which extends inward toward the magazine to cover substantially more than half the horizontal area of the annular space between the bottom edge of the magazine and said cylindrical body portion, and is spaced away from the magazine to provide a slot through which poultry may feed, and slender supports connecting said hopper and receptacle and spacing the lower edge of the hopper away from the bottom of the receptacle.

Signed at Poughkeepsie, in the county of Dutchess and State of New York, this 20th day of December A. D. 1921.

WILLIAM P. SHORTELL.